UNITED STATES PATENT OFFICE.

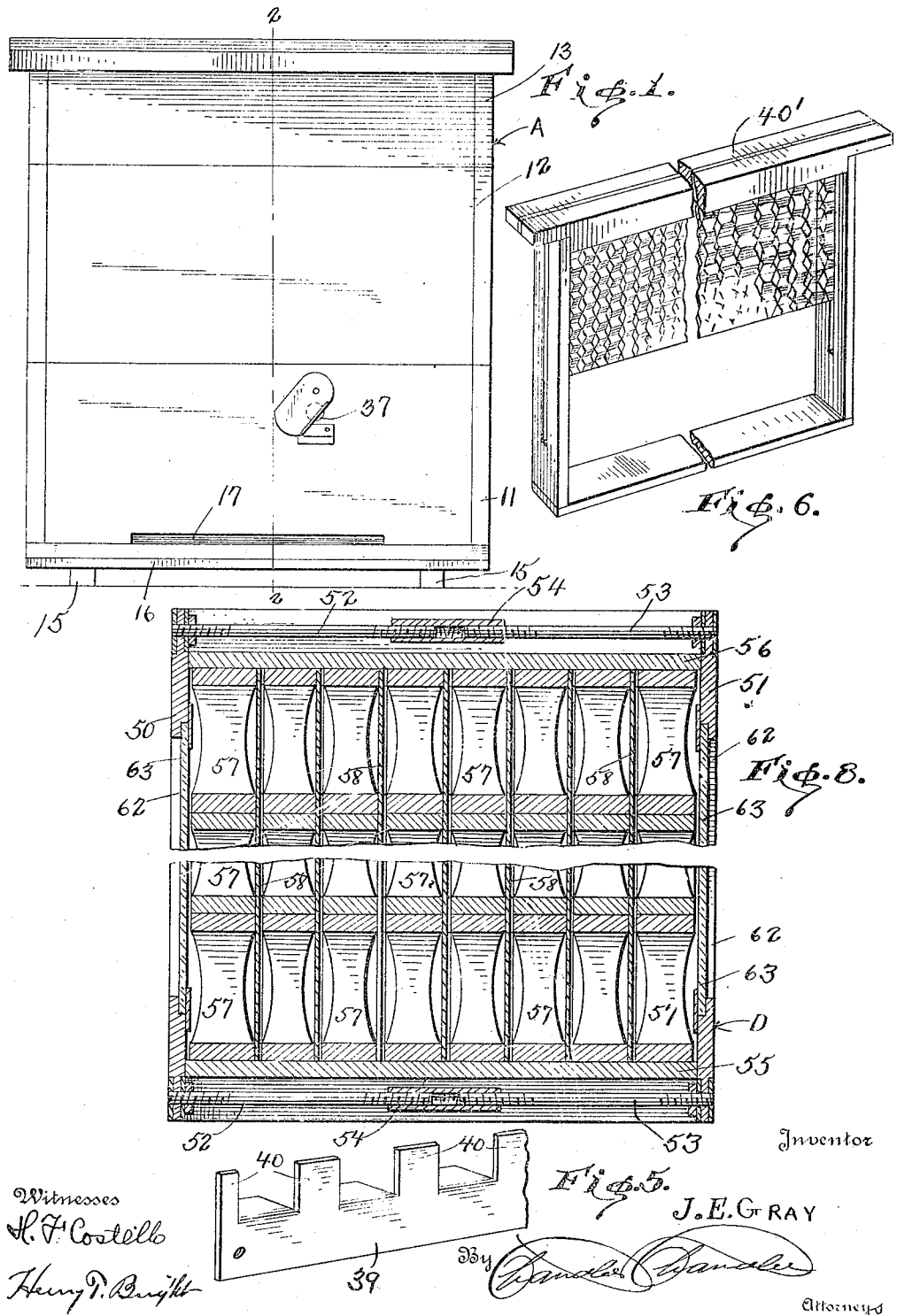

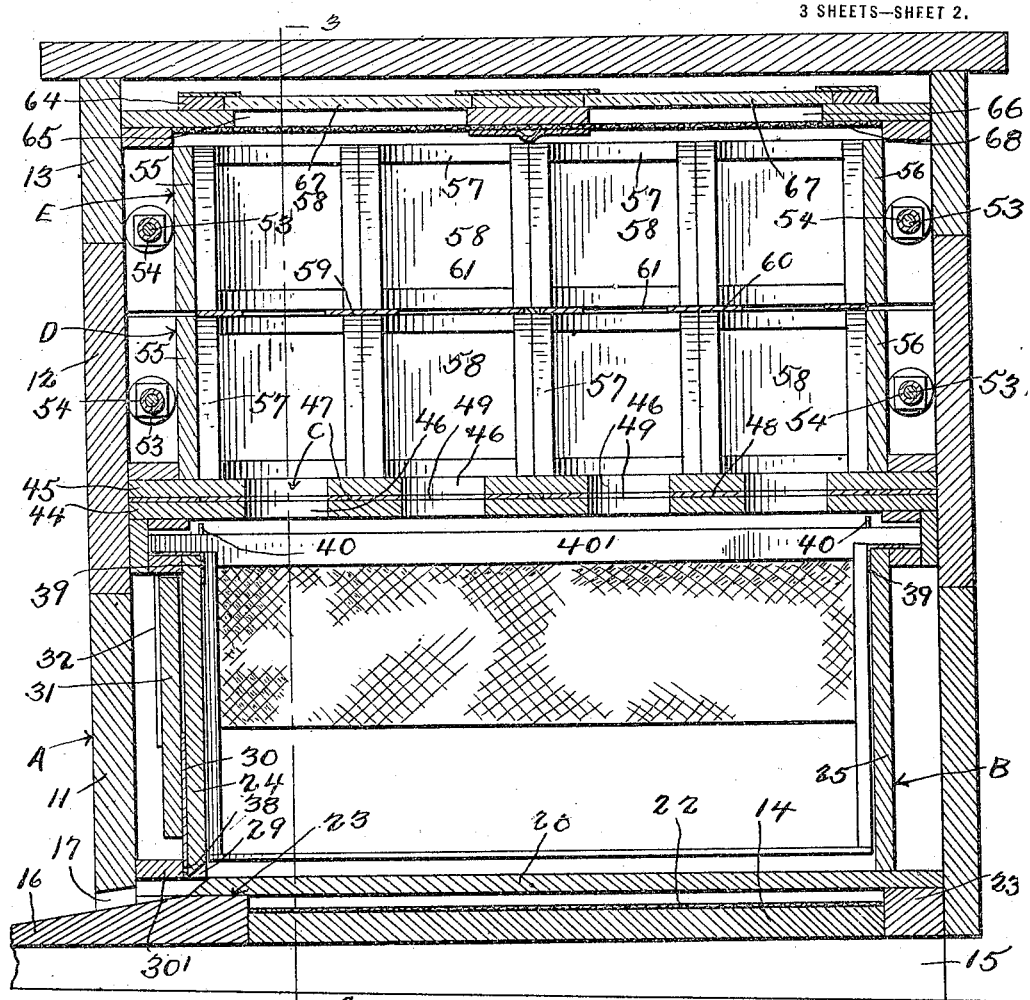

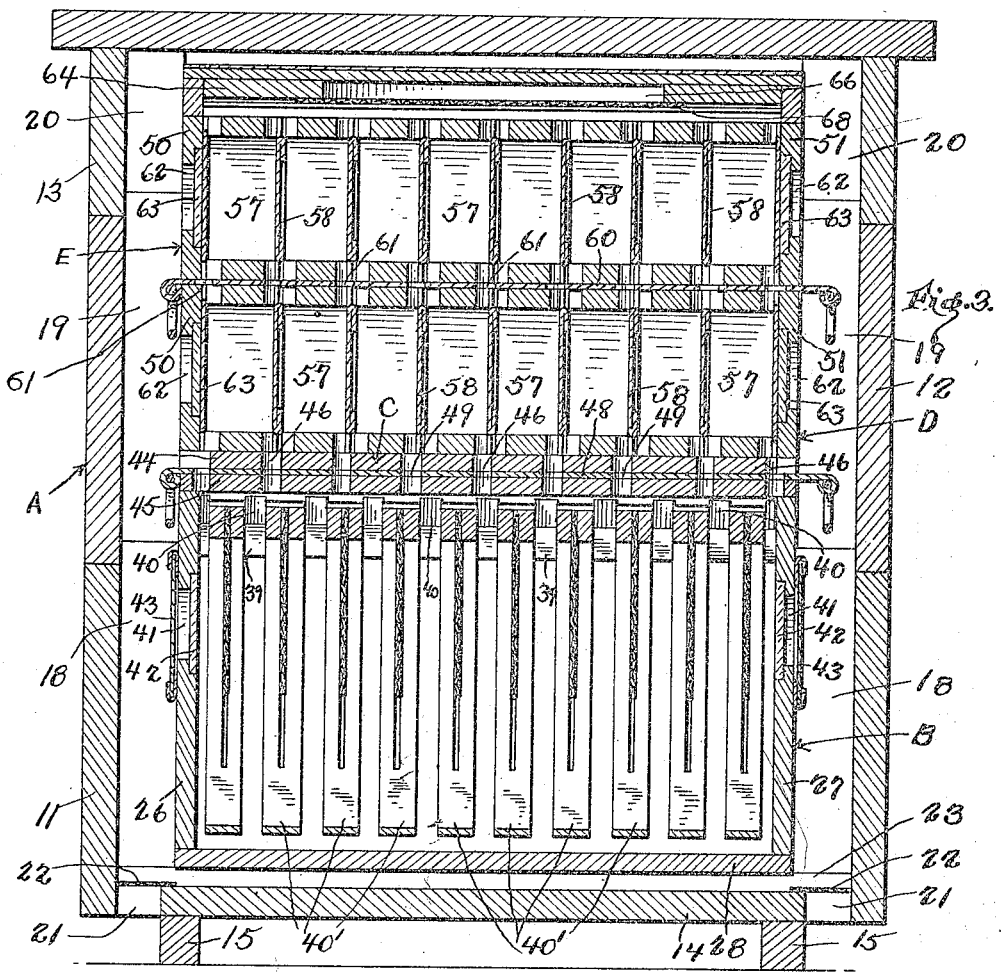
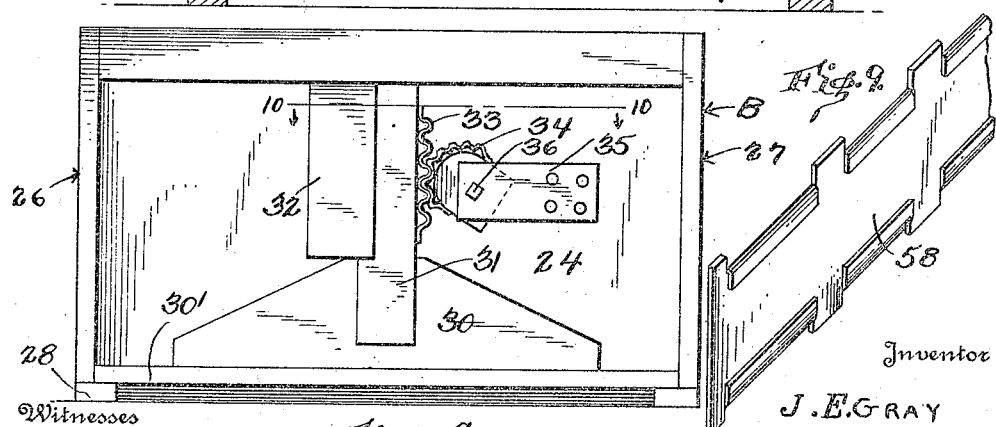

JOSEPH E. GRAY, OF FAIRFIELD, ILLINOIS.

BEEHIVE.

1,262,779.

Specification of Letters Patent.  Patented Apr. 16, 1918.

Application filed October 12, 1915.  Serial No. 55,473.

*To all whom it may concern:*

Be it known that I, JOSEPH E. GRAY, a citizen of the United States, residing at Fairfield, in the county of Wayne, State of Illinois, have invented certain new and useful Improvements in Beehives; and I do hereby declare the following to be a full, clear, and exact description of the invention, such as will enable others skilled in the art to which it appertains to make and use the same.

This invention relates to beehives.

The object of the invention is to provide a beehive embodying an improved construction whereby the hive will be maintained relatively cool in summer and relatively warm in winter, the improved construction of the hive also permitting the honey to be removed with facility and new comb frames easily applied.

A further object of the invention is to provide a beehive embodying an improved construction of brooder, an improved construction of super, and means for controlling the passages of the bees from the brooder to the super.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a front elevation of a hive constructed in accordance with the invention;

Fig. 2, a section on the line 2—2 of Fig. 1;

Fig. 3, a section on the line 3—3 of Fig. 2;

Fig. 4, a front view of the brooder removed;

Fig. 5, a perspective view of one of the spacing members employed to hold the brooder frames in spaced relation;

Fig. 6, a perspective view of a brooder frame;

Fig. 7, a front view of one of the supers;

Fig. 8, a horizontal section through one of the supers;

Fig. 9, a perspective view of one of the super spacers, and

Fig. 10, a section on the line 10—10 of Fig. 4.

Referring to the drawings the improved hive is shown as comprising a body casing A which includes a bottom section 11, an intermediate section 12 and a top section 13. The section 11 includes a bottom 14 having tapering ribs 15 on the underside thereof and said bottom extending forwardly to form a platform 16. The front wall of the section 11 is provided with the usual and entrance opening 17. The section 11 also includes corner cleats 18 which project above the top edge of the section and abut the lower ends of corner cleats 19 embodied in the section 12. Likewise the corner cleats 19 project above the top edge of the section 12 and abut the lower ends of corner cleats 20 embodied in the section 13. By this arrangement of the cleats 18, 19 and 20 the sections 11, 12 and 13 are interlocked against lateral displacement relative to each other although they can readily be displaced by vertical movement. The bottom 14 of the section 11 is provided on opposite sides with recesses 21 which are covered by sheets of wire mesh 22 respectively. Provided at the front and rear of the bottom 14 are ledges 23 which serve to support a brooder B in spaced relation to the bottom 14 and thus form an air space between the bottom of the brooder and the bottom of the section 11.

The brooder B comprises a front wall 24, a rear wall 25, side walls 26 and 27 and a bottom wall 28. The front and rear walls 24 and 25 are set a slight distance inwardly of the ends of the side walls and the forward end of the bottom walls 28 is recessed as at 29 and this recess is bridged by a member 30' disposed in slight spaced relation to the front wall 24. The inner wall of the recess 29 and the bottom edge of the front wall 24 are correspondingly beveled and spaced to form an entrance and exit passage to the brooder. This passage is controlled by a door 30 having a stem 31 slidably mounted in a guide 32 and provided on one edge with a rack bar 33 with which latter meshes a pivoted toothed segment 34 journaled in a bracket 35 mounted on the front wall 24 of the brooder. The segment 34 carries a projection 36 which alines with its axis of rotation and also alines with an opening 37 in the front wall of the section 11. A suitable key is adapted to be inserted through the opening 37 and engaged on the projection 36 whereby the segment 34 may be rotated to move the door 30 to opened or closed position with respect to the exit and entrance passage of the brooder This door 30 is provided with a plurality of openings 38 which are disposed in line with the entrance and exit passage of the brooder when the door 30 is in closed position to permit of circulation of air to the brooder. It will be noted that the door 30 moves between the member 30' and the front wall 24. Secured to the inner sides of the front and rear walls of the brooder respectively are spacing members 39 in the form of metal strips slit transversely to produce tongues 40. Alternate tongues are bent at right angles to the strip so as to overlie the top edge of respective front and rear walls. Supported upon the top edges of the front and rear walls of the brooder are comb frames 40' having their top members extended and disposed between the upstanding tongues 40. The side walls 26 and 27 are provided respectively with openings 41 across which is disposed a glass pane 42 so as to form an observation window. These windows are adapted to be closed by means of shutters 43 slidably mounted respectively on the side walls 26 and 27.

Detachably mounted on the top of the brooder B is a division member C which comprises superimposed panels 44 and 45 having registering openings 46 therein respectively. Slidably mounted between the panels 44 and 45 are shutters 47 and 48 provided respectively with openings 49 adapted when the shutters are in one position to aline with the openings 46. In other positions of the shutters communication between alined openings 46 is closed. Through the medium of these shutters the movement of the bees through the openings 46 can be controlled. Mounted on the division member C is a super D and upon this super D is mounted another super E. As the supers D and E are identical in construction only one of them will be referred to in detail. The super D comprises side members 50 and 51 which are connected together at their ends by rods 52 and 53, the latter being in turn connected by a turn buckle 54. Disposed between the side members 50 and 51 is a front member 55 and a rear member 56. Mounted in the super thus formed is a plurality of comb frames 57 between which are disposed spacing members 58. In mounting the frames 57 in place the turn buckles 54 are operated to relieve the tension on the side members 50 and 51. The frames and spacing members are then applied and the turn buckles operated to clamp the parts in assembled relation. Slidably mounted between the supers D and E are shutters 59 and 60 provided respectively with openings 61 adapted in one position of the shutters to aline with the spaces between the frames 57 and thereby permit the passage of the bees to the super E. When the shutters 59 and 60 are moved to dispose the opening 61 out of registration with the spacing between the frames 57 the bees are prevented from passing to the super E. The side members 50 and 51 of each super are provided with openings 62 which are closed by glass panes 63 whereby the condition of the frames 57 may be observed.

Disposed upon the super E is a top member 64 provided with openings 65 and 66. These openings are covered by glass panes 67 secured upon the top of the member 64 and by a sheet of wire mesh 68 secured to the bottom of the member 64.

What is claimed is:—

1. In a beehive, the combination with a casing having an entrance opening in one wall, of a brooder disposed within the casing and having a wall spaced from the wall of the casing which is provided with the entrance opening, said wall of the brooder having also an entrance opening therein, a member disposed between the said walls of the brooder and casing to form the top of a passage way between the two entrance openings, a door slidably mounted upon the outer face of the said wall of the brooder and slidably engaged between the said wall and the member for movement into and out of position to close the passage way, and means for sliding the door.

2. In a beehive, the combination with a casing having an entrance opening in one wall, of a brooder disposed within the casing and having a wall spaced from the wall of the casing which is provided with the entrance opening, said wall of the brooder having also an entrance opening therein, a member disposed between the said walls of the brooder and casing to form the top of a passage way between the two entrance openings, a door slidably mounted upon the outer face of the said wall of the brooder and slidably engaged between the said wall and the member for movement into and out of position to close the passage way, a stem carried by the door, a rack bar carried by the stem, a tooth segment pivotally mounted upon the said wall of the brooder and engaged with the rack bar, and a projection carried actually by the tooth segment and adapted for the reception of a key for the movement of the segment, said wall of the casing having an opening therein opposite to the projection for the engagement for such a key therethrough.

In testimony whereof, I affix my signature, in the presence of two witnesses.

JOSEPH E. GRAY.

Witnesses:
EMMA K. GLESSING,
ALBERT L. CRYOR.